June 12, 1934.  H. W. CLARK  1,962,636
SHEARS
Filed Feb. 8, 1930
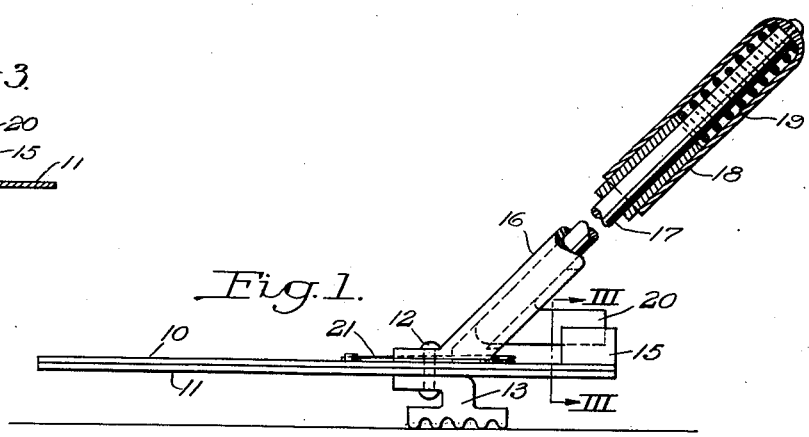
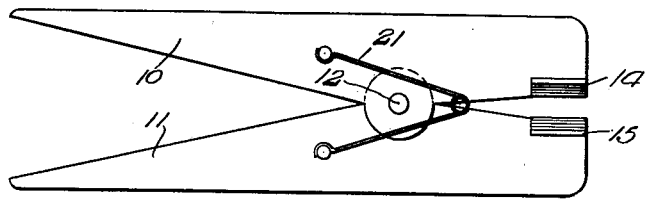
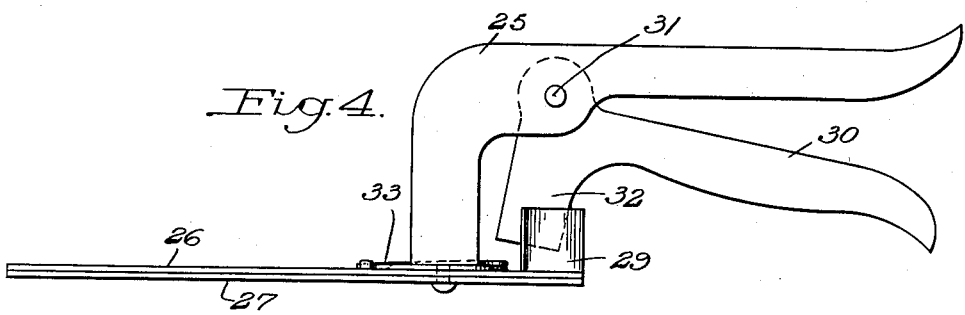
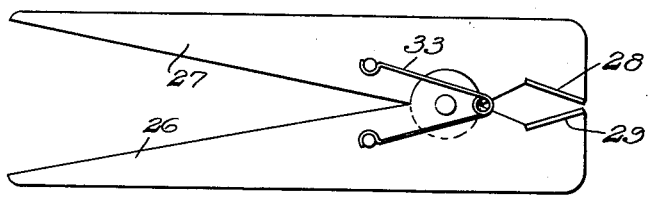
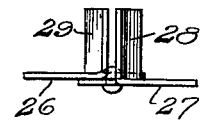
INVENTOR
Harold W. Clark
by his attorneys
Byrnes, Stebbins, Parmelee & Blenko Patented June 12, 1934

1,962,636

UNITED STATES PATENT OFFICE 1,962,636

SHEARS

Harold W. Clark, Alliance, Ohio, assignor to The Alliance Manufacturing Company, Alliance, Ohio, a corporation of Ohio Application February 8, 1930, Serial No. 426,880

3 Claims. (Cl. 30—11)

My invention relates to shears, and particularly to that class of shears employed for trimming lawns or hedges.

I have invented a novel form of shears for this purpose which is characterized by a positive action, easy of operation, and a long life of service.

Certain preferred embodiments of the invention are illustrated in the accompanying drawing in which Fig. 1 is a side elevation partly in section of one type of shear embodying the invention;

Fig. 2 is a plan view thereof with the handle removed;

Fig. 3 is a sectional view taken along the line 3—3 of Fig. 1;

Fig. 4 is a side elevation of a modified form;

Fig. 5 is a view of the modification similar to Fig. 3;

Fig. 6 is a rear view of the modification shown in Figs. 4 and 5.

Referring to the drawing and especially to Figs. 1 to 3 inclusive, I provide a shear having sheet metal blades 10 and 11 which are pivoted on a rivet 12 secured to a foot 13 adapted to rest on the ground and preferably having its bottom corrugated or otherwise roughened. The rear ends of the blades 10 and 11 have upwardly extending lugs 14 and 15 formed of upwardly bent portions of the bodies of the blades which are bent back at an angle to the vertical with the broad faces opposite each other. A handle 16 in the form of a hollow tube is secured to the rivet 12. A rod 17 is slidable within the tubular handle 16 and has an operating sleeve 18 which fits over the handle 16. A compression spring 19 urges the rod 17 to its outermost position.

The lower end of the rod 17 has a rearwardly extending wedge-shaped portion 20 which is adapted to extend between the lugs 14 and 15 and engage the opposite broad faces of the lugs.

From the foregoing it will be apparent that the blades 10 and 11 may be actuated into cutting relationship by pushing down on the rod 17 through the medium of the sleeve 18 so that the extension 20 will engage the lugs 14 and 15. When the sleeve 18 is released, the rod 17 is withdrawn by the spring 19 and the blades 10 and 11 are restored to their original position by means of a spring 21.

The handle 16 may be of any length adapted for convenient manipulation of the shear.

The modified form of the invention described above is illustrated in Figs. 4 through 6. The modified form comprises a handle 25 with blades 26 and 27 pivoted thereto. These blades have upstanding lugs 28 and 29 struck up from the bodies of the blades and extend vertically but are at an angle to the length of the shear blades.

An operating lever 30 is pivoted to the handle 25 at 31 and is provided with a wedge-shaped downward projection 32. This projection is adapted to engage the lugs 28 and 29 when the lever 30 is lifted as by an operator gripping the latter and the handle 25 in his fingers. The movement of the projection 32 forces the blades 26 and 27 together. They are restored to their original position by a spring 33.

It will be seen that both of the modifications of the invention include means for positively effecting the engagement of the shear blades to shear the material therebetween. In addition, the modification of Figs. 1 through 3 has a stable supporting base and yet is of such size and design as to be readily portable. The modification of Figs. 4 through 6 is readily operable by one hand and is light in weight yet sufficiently strong for the service required of it.

Although I have illustrated and described only two modifications of the invention, it will be obvious that it may be practised in other forms, and for this reason I do not intend to be limited to the details illustrated since any changes therein may be made without departing from the spirit of the invention as defined by the appended claims.

I claim:

1. In a shear, the combination with a handle, a pair of sheet metal blades pivoted thereon, thin flat lugs having broad faces struck up from the bodies of the blades with their broad faces opposite each other and at an angle to each other, of an operating means movably carried by said handle including a wedge for engaging the opposite broad faces of the lugs to close said blades.

2. In a shear, the combination with a handle, a pair of sheet metal blades pivoted thereon, thin flat lugs having broad faces struck up from the bodies of the blades with their broad faces opposite each other and at an angle to each other and to the plane of the blades, of an operating means movably carried by said handle including a wedge for engaging the opposite broad faces of the lugs to close said blades.

3. In a shear, the combination with a handle, a pair of sheet metal blades pivoted thereon, thin flat lugs having broad faces struck up from the bodies of the blades with their broad faces opposite each other and at an angle to each other but perpendicular to the plane of the blades, of an operating means movably carried by said handle including a wedge for engaging the opposite broad faces of the lugs to close said blades.

HAROLD W. CLARK.